June 2, 1964 P. V. CHENEY ETAL 3,135,638

PHOTOCHEMICAL SEMICONDUCTOR MESA FORMATION

Filed Oct. 27, 1960 2 Sheets-Sheet 1

Preston V. Cheney,
John G. Quetsch, Jr.,
*INVENTORS.*
*BY.*
Charles S. Haughey
*ATTORNEY.*

PHOTOCHEMICAL SEMICONDUCTOR MESA FORMATION

Filed Oct. 27, 1960 2 Sheets-Sheet 2

Preston V. Cheney,
John G. Quetsch, Jr.,
INVENTORS.
BY.
Charles S. Haughey
ATTORNEY.

United States Patent Office 3,135,638

Patented June 2, 1964

3,135,638

PHOTOCHEMICAL SEMICONDUCTOR MESA FORMATION

Preston V. Cheney, Costa Mesa, and John G. Quetsch, Anaheim, Calif., assignors to Hughes Aircraft Company, Culver City, Calif., a corporation of Delaware Filed Oct. 27, 1960, Ser. No. 71,859

8 Claims. (Cl. 156—11)

This invention relates to semiconductor device fabrication, and more particularly to a photochemical method for forming mesas, or plateaus, on semiconductor crystals.

In semiconductor device fabrication, it is desirable to produce sharply defined raised portions, or mesas, on semiconductor surfaces. Particularly in transistor fabrication, which will be used herein to illustrate this invention, sharply defined mesas will allow the use of smaller area mesas for emitter and base portions of a transistor with equal or improved yield in production and equal or improved device characteristics and a smaller range of device parameters in a given production run. In diode production, sharply defined mesas also allow smaller and more uniform junction areas to be made.

It is accordingly an object of this invention to produce smaller, and more sharply defined mesas on semiconductor bodies; and more particularly to produce transistors having more sharply defined mesas including the emitter and base portions of the transistor, and to produce diodes having more sharply defined mesas including a P-N junction.

This invention will be particularly explained with respect to silicon semiconductor bodies, although it is applicable to germanium and other semiconductor materials.

Silicon mesas have heretofore been formed by securing physical shields to silicon crystal surfaces and then sandblasting and subsequently etching the damaged portions of the crystal formed during sandblasting. The physical shields have been attached, for example, by using thermoplastic material to fasten platinum pieces to the silicon crystal surface. Platinum is sufficiently malleable and resistant to sandblasting and to silicon etches to protect portions of the silicon from crystal damage and subsequent removal. This method is limited to shields of sizes and shapes that can be physically produced and handled, and is not easily susceptible to mechanization.

Silicon oxide films have been proposed for protection of semiconductor surface areas during selective etching of unprotected portions of the semiconductor. Photochemical techniques for defining the silicon oxide areas have been unsatisfactory due to poor definition of the silicon oxide areas and the inability to secure adequate protection of the silicon oxide surface by photochemical materials during etching of the oxide to define the desired oxide area.

It is a further object and advantage of this invention to produce semiconductor crystal shields by use of photochemical process, and to utilize the same to produce mesas of sharply defined configuration and of sizes and shapes independent of mechanical handling techniques, and by processes adaptable to automation.

The above and other objects and advantages of this invention will be apparent from the balance of this specification, disclosing the preferred embodiment of the invention, and in the accompanying drawings and claims forming a part thereof.

The formation of suitable mesas on suitably doped semiconductor crystal slices (hereinafter explained for silicon semiconductor crystals) according to this invention involves the formation, on a predetermined surface of a silicon crystal, of a layer of films of silicon oxide and chromium metal to serve as a crystal surface protective mask during preferential etching of the silicon crystal adjacent the mask, thus producing under the mask a mesa of silicon crystal material suitable for subsequent device fabrication. Suitable silicon oxide layers may be formed by oxidizing the surface of silicon semiconductor crystals, or by decomposing chemicals, such as silanes, on a semiconductor such as silicon or germanium. It is presumed that such films are silicon dioxide, and its properties appear to be those of silicon dioxide; whether silicon monoxide is also present in such films is not known. Such films are hereinafter generally referred to as $SiO_2$ films.

The layer of films is formed by successively forming films of $SiO_2$, chromium metal, and photosensitive polymerizable (PSP) material, followed by photochemically polymerizing selected portions of the PSP material, removing unpolymerized portions thereof, selectively removing exposed (or uncovered) portions of the chromium film, and thereafter of the $SiO_2$ film, to produce on the surface layers of $SiO_2$ and chromium films under the polymerized PSP material.

The polymerized PSP material is preferably removed before the etching of the silicon, and may be removed before the $SiO_2$ etching step so that the etching of the $SiO_2$ and of the silicon may proceed successively as a single process step.

Figure 1:
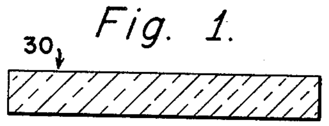
FIGS. 1 to 11 illustrate a sequential process for producing in a silicon semiconductor crystal surface-adjacent regions of opposite electrical conductivity type suitable for mesa-type transistor fabrication.
Figure 2:
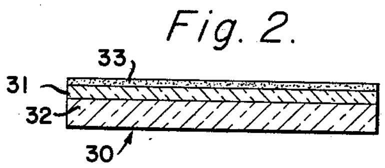

As illustrated in the drawings, FIG. 1 shows a P-type silicon semiconductor crystal 30 upon which a silicon oxide mask is to be formed for selective diffusion of boron as a dopant, or electrical conductivity type determining impurity. Various cleaning and degreasing steps which are well known in semiconductor operations are omitted herein for clarity of presentation. The crystal 30 is subjected to an atmosphere of $As_2O_3$ in argon at about 1200° C., to indiffuse arsenic and form an N-type region 31 on the crystal surface. The balance of the crystal 30 will be a P-type region 32. The above atmosphere will simultaneously grow a silicon oxide ($SiO_2$) film 33 on the crystal, which is preferably enhanced by humidifying the gas to about a 30° C. dew point before the end of the diffusion step. If desired, oxygen gas may also be added to the atmosphere to promote formation of the $SiO_2$ film. The arsenic indiffusion step is preferably maintained for 4 to 6 hours, by way of example, to produce an N-type region of 4 to 6 microns depth and a surface $SiO_2$ film 33 of 0.4 to 0.6 micron, as shown in FIG. 2. Proportions have been exaggerated in the drawing for illustrative purposes.

Figure 3:
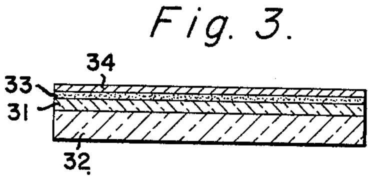

A germanium film 34 is next formed on the $SiO_2$ film by evaporation of germanium in a vacuum furnace. Films of from 0.15 to 9.0 microns have been used successfully, but 0.4 to 0.6 micron gives effective coverage and uniformity. This film is preferably formed by laying germanium on a tungsten filament, and heating the filament to evaporate the germanium in a vacuum of about $5\times10^{-5}$ mm. Hg to deposit the germanium on an exposed surface of the crystal at about 550° C. having the $SiO_2$ film thereon. FIG. 3 shows the resulting crystal 30 having an N-type region 31, a P-type region 32 for the balance of the crystal, an $SiO_2$ film 33 on the surface of the N-type region, and a germanium metal film 34 on the oxide film.

Figure 4:
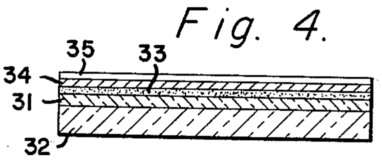
Figure 5:
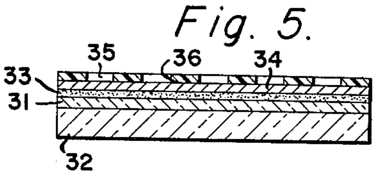
Figure 6:
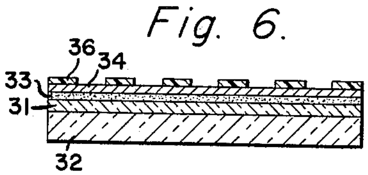

A film 35 of photosensitive polymerizable (PSP) material, such as polyvinyl alcohol, or a product well known on the market and sold under the trade name of Kodak Photo Resist by Eastman Kodak Company and believed to be a resinous ester of maleic anhydride and alkoxy hydroxy acetophenone, is next formed on the surface of the germanium, as shown in FIG. 4. The germanium is preferably lightly etched in a 4% hydrochloric acid etch for 30 seconds to remove any germanium oxide which may be present, and to improve adhesion thereto of the PSP material film. This film may be painted on, sprayed, or applied in any suitable way. The film 35 of PSP material is dried at about 70° C., then selectively exposed to ultraviolet light, preferably through a photographic film mask, to polymerize portions 36 of the film graphic film mask, to polymerize portions 36 of the film 35 which it is desired to retain as shown in FIG. 5. The crystal is then developed by rinsing with a solvent, such as methyl ethyl ketone, trichloroethylene, or Kodak Photo Resist Developer sold by Eastman Kodak Company, for the unexposed, hence unpolymerized, PSP material 35, leaving areas, for example, stripes, of polymerized PSP material 36 as shown in FIG. 6. The crystal is then baked at 70° C. to further polymerize and harden the film portions 36.

Figure 7:
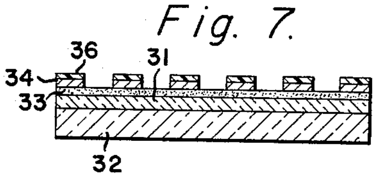

The exposed germanium between stripes of PSP material 36 is next etched and removed, in an etchant such as hydrogen peroxide and oxalic acid, to expose $SiO_2$ between the stripes of PSP material 36 as shown in FIG. 7. This etchant evolves relatively little gas when used below 40° C., and appears to have no substantial deleterious effect on the PSP material film.

Figure 8:
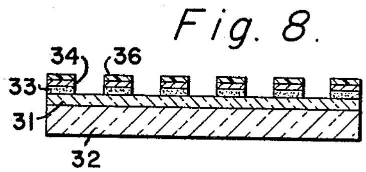

The exposed $SiO_2$ is next etched and removed by a hydrofluoric acid etch which selectively removes $SiO_2$ in the presence of silicon, germanium, and PSP material. FIG. 8 shows the resulting structure with alternate exposed areas of silicon crystal and stripes of layered PSP material, germanium and $SiO_2$.

Figure 9:
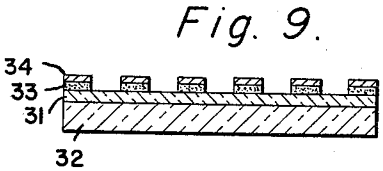
Figure 10:
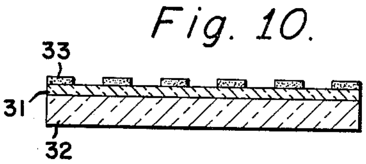

The PSP material 36 is next removed by softening with an appropriate solvent, such as methyl ethyl ketone, acetone, or trichloroethylene, and subsequent brushing, to expose the germanium film 34 in stripes as shown in FIG. 9. The crystal 30 is then subjected to a germanium solvent etch, such as hydrogen peroxide and oxalic acid, to expose the $SiO_2$ stripes on the crystal surface as shown in FIG. 10.

Figure 11:
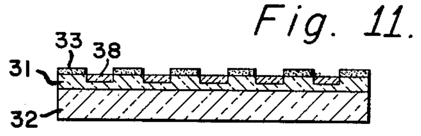

The above $SiO_2$ stripes are next used as a mask in a boron diffusion process wherein the crystal surface is exposed to a boron containing gas, such as boron oxide, to diffuse boron into the crystal between the oxide stripes and convert the adjacent crystal region 38 to P conductivity type, as shown in FIG. 11.

Figure 12:
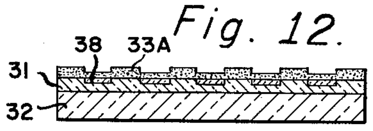
FIGS. 12 to 21 illustrate a further sequential process for mesa formation and crystal device fabrication according to this invention.

An oxide film 33A is then regrown on the crystal surface, as shown in FIG. 12, exposure to about 30° C. dew point argon atmosphere at about 900° C. for 16 hours being sufficient for the purpose. An oxide film of about 6,000 Angstroms thickness has been found sufficient to insure adhesion of a subsequently deposited chromium film. In some cases, especially where the oxide film 33 was relatively thick, it is preferable to remove the oxide stripe 33 before growing the new film 33A to insure oxide adherence to the parent crystal.

Figure 13:
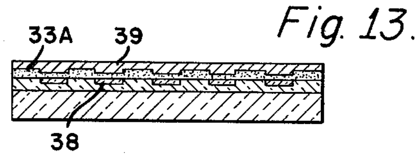
Figure 14:
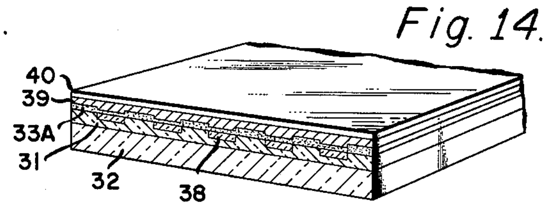

A film 39 of chromium as shown in FIG. 13 is then vapor deposited on the oxide film 33A, preferably by vaporizing chromium from a tungsten filament in a vacuum furnace. The film 39 of chromium is then covered with a film 40 of unpolymerized PSP material, which may be painted on with a brush, to produce the structure of FIG. 14.

Figure 15:
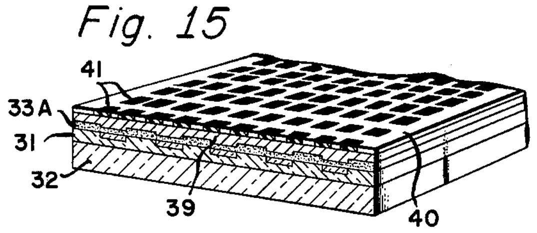

The PSP material of film 40 is next exposed to ultraviolet light through a photographic film mask positioned to expose and polymerize squares 41 bridging the junctions between the P-regions 38 and the N-regions 31 at the surface of the crystal, underlying the several films, as shown in FIG. 15. The PSP material of film 40 is then rinsed with a solvent for the unpolymerized PSP material, such as methyl ethyl ketone, as before discussed, to remove unpolymerized PSP material and leave the pattern of square areas 41 of polymerized PSP material bridging the P and N regions of the crystal surface. The material of the squares 41 is then baked and hardened as with the previous film stripes 36.

Figure 16:
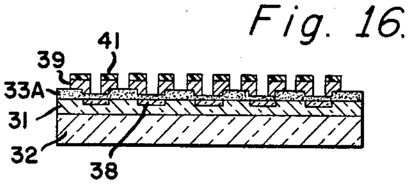
Figure 17:
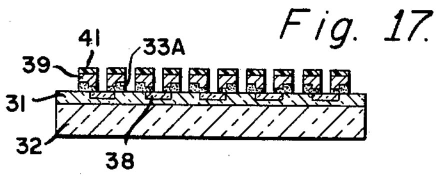
Figure 18:
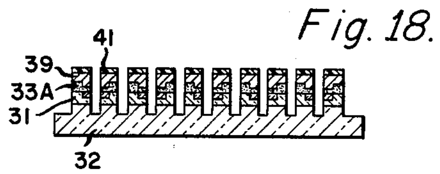

The chromium film now uncovered between the squares 41 is next removed by an HCl etchant of about 50% and at about 70° to 80° C., to expose the underlying $SiO_2$ film as shown in FIG. 16. This exposed portion of the $SiO_2$ film, and the silicon crystal thereunder, is then etched, with a (1:1:2) solution of nitric acid, hydrofluoric acid and acetic acid, for example, to remove material down to and into the lower P-type crystal region 32, leaving mesas of crystal under each square 41 as shown in FIG. 18.

Figure 20:
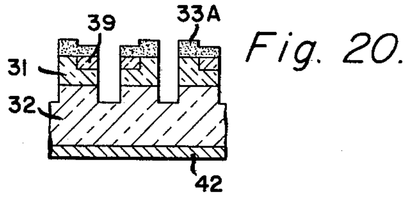
Figure 19:
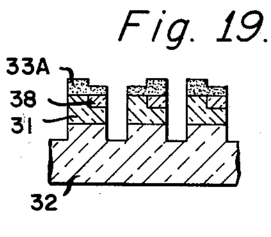
Figure 21:
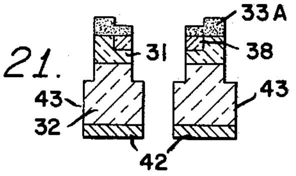

The square layers of polymerized PSP material and chromium, are next removed in successive etching operations utilizing a PSP material solvent such as trichloroethylene, with brushing of the softened PSP material, and a chromium solvent such as 37 to 39% HCl at 50° to 60° C. The resulting structure, shown in FIG. 19, is next provided with an ohmic contact on the reverse crystal face, as by fusing aluminum 42 thereto as shown in FIG. 20 for subsequent attachment of a collector. The crystal is then diced to separate out crystal elements 43 as shown in FIG. 21, each having a mesa structure thereon protected by an oxide film, for subsequent device fabrication by removal of the oxide film, attachment of leads and encapsulation.

The chromium metal film 39, utilized in the mesa formation steps to protect the crystal surface under the squares 41 of polymerized PSP material, together with such material, provides sharp delineation of the mesa area and adequate protection of the mesa area, and thus makes possible use of smaller mesa formations, more accurate positioning and register of the mesas with the preformed P- and N-type region surface junction within the mesa, and many design variations, in a method which is highly suitable for mechanization and whose use improves device characteristics and reduces device rejects at the same time. The silicon oxide film serves both to separate the chromium from the underlying semiconductor material and to insure adequate adhesion of the chromium, particularly in silicon semiconductors since chromium has very poor adhesion to silicon material.

The process as above illustrated depends upon the selectivity of etchants used as well as the adherence and protective properties of the intermediate metal film. It may be applied to silicon and germanium and other semiconductor materials, such as III–V compound semiconductors, when the second, or metal, film is chromium, nickel, platinum, molybdenum, palladium, alloys thereof such as nickel-chromium alloys, and such other metals as may be selectively etched in the presence of the silicon oxide film and the semiconductor, and which selectively resists silicon oxide etchants and the semiconductor material etchants.

Having disclosed our invention, we claim:

1. A process for producing a mesa formation on a germanium body, which comprises: forming a first film of silicon oxide on a surface of said body; forming a second film of a metal which may be selectively etched in the presence of germanium and silicon oxide, and which selectively resists germanium and silicon oxide etchants, on said first film; forming a third film of photosensitive polymerizable material on said second film; exposing a portion of said third film to sufficient light to polymerize said portion; developing said third film to remove the unpolymerized portion of said third film; selectively removing the portion of said second film uncovered by removing said unpolymerized third film portion; removing the portion of said first film uncovered by removing said portion of said metal film; and removing a portion of the germanium body adjacent the surface thereof uncovered by removing said portion of said first film, whereby to form a mesa on said germanium body.

2. A process for producing a mesa formation on a semiconductor crystal body, which comprises: forming a first film of silicon oxide on a surface of said body; forming a second film of chromium on said first film; forming a third film of photosensitive polymerizable material on said chromium film; exposing a portion of said third film to sufficient light to polymerize said portion; developing the same to selectively remove the unpolymerized portion of said third film; selectively removing the portion of said chromium film unprotected by said polymerized film portion; selectively removing the portion of said oxide film unprotected by said chromium film; and selectively removing a portion of the semiconductor crystal uncovered by removal of said portions of chromium and oxide films whereby to produce said mesa formation.

3. The process according to claim 2 wherein the body is silicon.

4. A process for producing a mesa formation on a body, which comprises: forming a first film of silicon oxide on a surface of said body; forming a second film of a metal which may be selectively etched in the presence of said body and silicon oxide, and which selectively resists etchants for silicon oxide and said body on said first film; forming a third film of photosensitive polymerizable material on said second film; exposing a portion of said third film to sufficient light to polymerize said portion; developing the same to selectively remove the unpolymerized portion of said third film; selectively removing the portion of said second film uncovered by removal of said unpolymerized portion; selectively removing the portion of said oxide film unprotected by said second film; and selectively removing a portion of the body uncovered by removal of said portions of the second and first films whereby to produce said mesa formation.

5. A process for producing a mesa formation on a silicon body, which comprises: oxidizing a surface of said body to form a silicon oxide film thereon; forming a second film of a metal which may be selectively etched in the presence of silicon and silicon oxide, and which selectively resists silicon and silicon oxide etchant, on said first film; forming a third film of photosensitive polymerizable material on said second film; exposing a portion of said third film to sufficient light to polymerize said portion; developing said third film to remove the unpolymerized portion of said third film; selectively removing the portion of said second film uncovered by removing said unpolymerized third film portion; removing the portion of said first film uncovered by removing said portion of said metal film; and removing a portion of the silicon body adjacent the surface thereof uncovered by removing said portion of said first film, whereby to form a mesa on said silicon body.

6. A process for producing a semiconductor diode from a semiconductor body having alternate regions therein of P-type and N-type electrical conductivity forming a PN junction in a plane substantially parallel to a surface of said body, which comprises: forming a first film of silicon oxide on said surface; forming a second film of a metal which may be selectively etched in the presence of silicon oxide and said body, and which selectively resists etchants for said body and silicon oxide, on said first film; forming a third film of photosensitive polymerizable material on said second film; exposing a portion of said third film to sufficient light to polymerize said portion; developing said third film to remove the unpolymerized portion of said third film; selectively removing the portion of the second film uncovered by removing said unpolymeirzed third film portion; removing the portion of said first film uncovered by removing said portion of said second film; and removing from said body, adjacent said surface and uncovered by removing said portions of said first and second films, a portion of said body extending through the said PN junction.

7. The process according to claim 6 wherein the second film is a metal of the class consisting of chromium, nickel, platinum, molybdenum and palladium and alloys thereof.

8. A process for producing a semiconductor transistor from a semiconductor body having a first conductivity type region adjacent a surface of said body, a second conductivity type region of opposite type to said first region adjacent and underlying said first region to form a PN junction in part substantially parallel to said surface and in part intersecting said surface, and a third conditivity type region underlying said first and second regions and of the conductivity type opposite to that of the second region to form a second PN junction therebetween, which comprises: forming a first film of silicon oxide on said surface; forming a second film of a metal which may be selectively etched in the presence of silicon oxide and said body, and which selectively resists etchants for said body and silicon oxide, on said first film; forming a third film of photosensitive polymerizable material on said second second film; exposing a portion of said third film to sufficient light to polymerize said portion; developing said third film to remove the unpolymerized portion of said third film; selectively removing the portion of the second film uncovered by removing said unpolymerized third film portion; removing the portion of said first film uncovered by removing said portion of said second film; and removing from said body adjacent said surface and uncovered by removing said portion of said first and second films, a portion of said body extending through the second PN junction.

References Cited in the file of this patent

UNITED STATES PATENTS

| | | |
|---|---|---|
| 1,857,929 | McFarland | May 10, 1932 |
| 1,922,434 | Gundlacg | Aug. 15, 1933 |
| 2,215,128 | Meulendyke | Sept. 17, 1940 |
| 2,731,333 | Ko et al. | Jan. 17, 1956 |
| 2,799,637 | Williams | July 16, 1957 |
| 2,899,344 | Atalla et al. | Aug. 11, 1959 |
| 2,968,555 | Bendler et al. | Jan. 17, 1961 |
| 3,012,920 | Christensen et al. | Dec. 12, 1961 |
| 3,079,254 | Rowe | Feb. 26, 1963 |